United States Patent [19]

Lange et al.

[11] Patent Number: 5,467,662
[45] Date of Patent: Nov. 21, 1995

[54] BALL NUT AND SCREW ASSEMBY WITH ENHANCED RADIAL LOAD CAPACITY

[75] Inventors: David A. Lange; Robert L. Benton, both of Bay City; William E. Welling, Saginaw, all of Mich.; Peter R. Mugglestone, Northport, N.Y.

[73] Assignee: Thomson Saginaw Ball Screw Company, Inc., Saginaw, Mich.

[21] Appl. No.: 230,330

[22] Filed: Apr. 20, 1994

[51] Int. Cl.$^6$ ................................ F16H 25/22
[52] U.S. Cl. ........................ 74/459; 74/424.8 R
[58] Field of Search ............... 74/424.8 R, 459, 74/424.8 NA

[56] References Cited

U.S. PATENT DOCUMENTS

| | | | |
|---|---|---|---|
| 676,044 | 6/1901 | Locke | 74/459 X |
| 2,298,011 | 10/1942 | Hoffar | 74/459 |
| 2,455,368 | 12/1948 | Hoffar | 74/459 |
| 3,667,311 | 6/1972 | Wysong | 74/459 |
| 3,673,886 | 7/1972 | Tomita et al. | 74/459 |
| 3,826,153 | 7/1974 | Sheppard | 74/459 |
| 4,221,137 | 9/1980 | Futaba | 74/459 X |
| 4,557,156 | 12/1985 | Teramachi | 74/459 |
| 4,896,552 | 1/1990 | Virga | 74/459 X |
| 5,142,929 | 9/1992 | Simpson, III | 74/459 |

*Primary Examiner*—Allan D. Herrmann
*Attorney, Agent, or Firm*—Learman & McCulloch

[57] ABSTRACT

A ball nut and screw assembly has a conventional helical raceway and balls received therein that react load through the centerline of the assembly and an added helical raceway and balls received therein that react radial load on the ball nut to the relief of the first mentioned raceway and balls.

20 Claims, 2 Drawing Sheets

BALL NUT AND SCREW ASSEMBY WITH ENHANCED RADIAL LOAD CAPACITY

TECHNICAL FIELD

This invention relates to ball nut and screw assemblies and more particularly to the mechanism therein for reacting radial load on the ball nut.

BACKGROUND OF THE INVENTION

Conventional ball nut and screw assemblies are normally designed with a helical ball raceway formed by mating helical grooves whose sides but not their bottom contact the balls to react load axially through the centerline of the assembly. While thus well adapted to reacting the axial loading, a simultaneous radial or side load on the ball nut places an extreme burden on the raceway greatly reducing the load carrying capacity and useful life of the ball nut.

Examples of various ball nut and screw assemblies are disclosed in U.S. Pat. Nos. 2,298,011; 4,221,137 and 4,557, 156. As can be gathered from their ball groove configurations, they may be well adapted for axial loading but not radial loading.

SUMMARY OF THE INVENTION

The present invention resolves this problem by the addition of a second helical ball raceway that parallels the normal one that effects translation of the nut or screw on relative rotation thereof. In the presently preferred embodiment of the invention, the added raceway is formed by an internal helical ball groove added to the ball nut parallel to the normal ball groove therein and by the helical land that normally exists on the screw and extends parallel to the normal ball receiving groove on the latter. The added helical ball raceway has balls received therein and a ball return similar to that of the conventional axial load bearing helical ball circuit but the added helical groove in the ball nut has a surface whose curvature is designed to contact along the bottom but not the sides thereof with the balls circulating in this added raceway.

The added raceway and balls are sized so that these balls remain in continuous contact (slight preload) with this raceway at points in a plane perpendicular to the centerline of the assembly and thus in the best position to react radial loads on the ball nut to the relief of the primary axial load bearing balls and raceway. Moreover, the two halves of the added raceway, i.e. the helical land on the screw and the added internal helical groove in the nut, are independent of each other. As a result, no interaction occurs between this added radial load bearing helical ball circuit and the axial load bearing or primary helical ball circuit regardless of whether the latter is preloaded with no lash or not preloaded with maximum lash In carrying out the invention, the added radial load bearing raceway may also be formed by a double lead groove arrangement on the screw as well as the nut. In this case, the added internal helical ball receiving groove in the nut and a mating external helical ball receiving groove added to the screw are formed at their bottom with a helical land of constant radius. The balls are maintained in continuous contact with the bottom of these grooves to accept radial loading as before. The width of these added radial load bearing grooves including that of their helical land is made wide enough to maintain the sides of these grooves out of contact with the balls up to the maximum lash allowed in the axial load bearing ball circuit so these two circuits remain independent of each other to accept the radial and axial loads.

It is therefore a primary object of the present invention to provide a new and improved ball nut and screw assembly.

Another object is to provide a ball nut and screw assembly with significantly enhanced radial load bearing capacity.

Another object is to provide a ball nut and screw assembly having an added helical raceway and ball arrangement that reacts radial loads to the relief of the normal axial load reacting helical raceway and ball arrangement.

Another object is to provide a ball nut and screw assembly having one helical ball circuit that reacts load through the centerline of the assembly and another helical ball circuit that reacts radial loads on the ball nut to the relief of the one helical ball circuit but does not interact therewith regardless of whether the latter is preloaded with no lash or is not preloaded with maximum lash.

Another object is to provide a ball nut and screw assembly having an added helical raceway and ball arrangement that reacts essentially all radial loads on the nut wherein one half of the raceway is formed by a helical land that normally exists on the screw.

Another object is to provide a ball nut and screw assembly having an added helical raceway and ball arrangement that reacts essentially all radial loads on the nut wherein the added raceway is formed by mating helical grooves on the nut and screw.

BRIEF DESCRIPTION OF THE DRAWINGS

These and other objects, advantages and features of the present invention will become more apparent from the following description and accompanying drawings wherein.

DETAILED DESCRIPTION OF THE DRAWINGS

Figure 1:
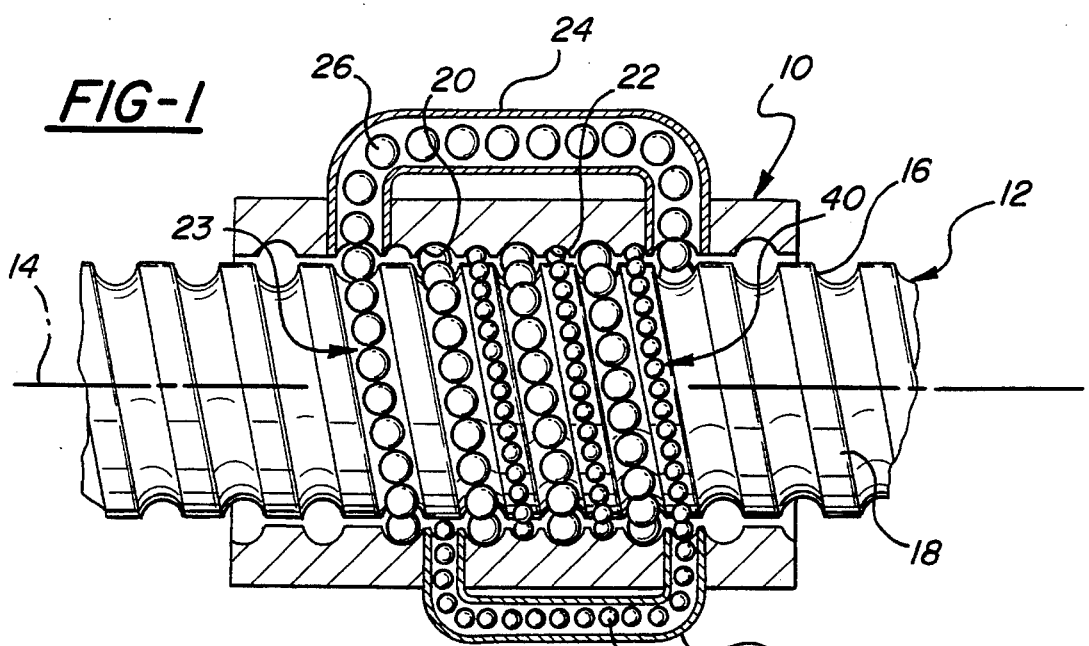
FIG. 1 is a longitudinal sectional view of a ball nut and screw assembly constructed according to a presently preferred embodiment of the present invention.

Referring to FIG. 1, there is illustrated a ball nut and screw assembly comprising a nut 10 received on a screw 12 with these components concentric to a centerline 14. The screw has an external helical ball receiving groove 16 and a helical land 18 of constant radius extending parallel to each other along the length thereof. The nut has a pair of independent internal helical ball receiving grooves 20 and 22 parallel to each other extending along the length thereof and complementary to the external screw groove 16 and land 18, respectively. As such, the nut may be referred to as a double lead nut.

Figure 2:
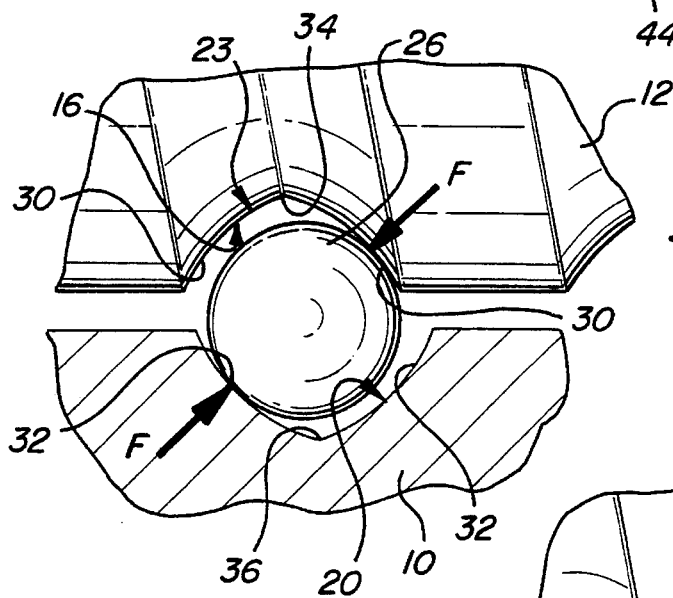
FIG. 2 is an enlarged view of a portion of the axial load bearing helical ball circuit in FIG. 1.

The nut and screw are operatively connected for relative translation on relative rotation thereof in a conventional manner by a helical ball circuit comprising the screw groove 16 and nut groove 20 which co-operatively define a first ball raceway 23 therebetween. A ball return tube 24 is mounted on the nut and is connected at its opposite ends by radial passages therethrough to opposite ends of the raceway 23 so as to define therewith an endless ball path. An endless train of balls 26 is received in the ball path along the entire length thereof to complete the helical ball drive connection between the nut and screw. This ball and helical groove connection is designed to react load through the centerline 14 of the assembly. For that purpose, the grooves 16 and 20 are formed with a surface of compound curvature as seen in FIG. 2 that is designed to have the balls 26 contact these grooves along their generally radially extending respective sides 30 and 32 but not at their respective bottom diameter 34 and 36. The resulting two points of load bearing contact along with the lines of force are indicated by the large solid arrows F in FIG. 2 when the axial load is in one direction and it will be understood that these contact points will switch to the other side and be the mirror image thereof when the axial load is in the opposite direction.

The balls 26 operate in the helical raceway 23 in the conventional manner to effect relative translation of the nut and screw upon relative rotation thereof while rolling therealong and eventually being recirculated by the return tube 24. In such a conventional arrangement, it will be observed that the nut groove 20 carries the axial load through the balls 26, either from the nut to the screw groove 16 or from the screw to the nut groove. Without further support, a radial or side load applied to the nut will greatly reduce the load carrying capacity of the nut and shorten its useful life because the groove sides 30 and 32 while well adapted for axial loading are not well suited to react radial loading.

Figure 3:
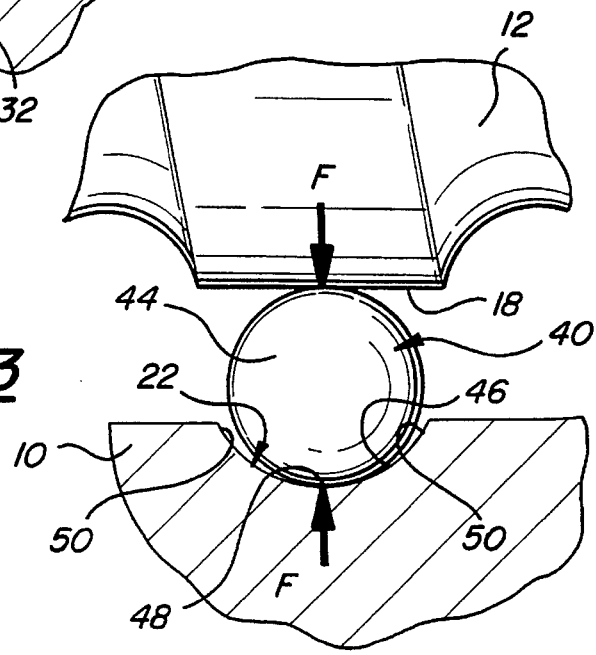
FIG. 3 is an enlarged view of a portion of the radial load bearing helical ball circuit in FIG. 1.

In accordance with the present invention, the added internal helical ball groove 22 in the nut cooperates with the external helical land 18 on the screw to define a second ball raceway 40 between the nut and screw. The surface of the helical land 18 is already hardened in the manufacture of the screw so there is sufficient hardness without any further heat treatment being necessary. Similar to the ball return system described above, a second return tube 42 is mounted on the nut and connected at its opposite ends through radial passages in the nut to opposite ends of the raceway 40 to define an endless ball path. An endless train of balls 44 is received in this ball path along the entire length thereof and rolls therealong without transmitting drive between the nut and screw while in their raceway 40 in a position to react radial loading of the nut. This is accomplished with the screw land 18 with its constant radius and by forming the added internal helical groove with a curved surface 46 as illustrated in FIG. 3. In contrast to the conventional axial loading grooves 16 and 20 in FIG. 2, the surface 46 of the added helical groove 22 is designed to contact along its bottom diameter 48 but not along its sides 50 with the balls 44. This can be accomplished by simply making the radius of the curved surface 46 greater than that of the balls 44 as shown in FIG. 3. To accommodate the interposition of the added ball circuit without changing the pitch or lead of the helical grooves 16 and 20, the diameter of the balls 44 and the width of their accommodating groove 22 are made substantially smaller than that of the balls 26 and grooves 16 and 20 as shown. This is possible as the former are only required to carry radial loads that are typically much smaller than the axial loads to be encountered. However, it will be understood that they could also be the same size or of larger size where the pitch of the axial load bearing grooves is larger. In any event, the two helical ball circuits are independent of each other and their relative size depends on the desired load capacity and the pitch or lead of the grooves as well as the space available in the nut as limited by the diametral envelope in which the nut is required to fit.

The added raceway 40 and balls 44 are sized in relation to each other so that these balls are in continuous contact under a slight preload with this raceway at points lying in a plane perpendicular to the centerline of the assembly. As a result, there is no radial lash and the balls 44 and their associated ball groove 22 and screw land 18 are in an ideal relationship to react any radial forces acting on the nut. These contact points and the radial force directions are depicted by the large solid arrows F in FIG. 3. With no radial lash in the assembly, any radial load will be reacted by deflection of material in the screw land, balls, and added nut groove for added stiffness. Moreover, this, in conjuncture with the land 18, allows lash to be in the axial load bearing raceway 23 and not affect the radial load bearing nut groove 22. Furthermore, the two nut grooves need not be exactly matched to each other to obtain a smooth operating assembly. Since the two nut grooves are independent of each other, there is no interaction therebetween regardless of whether the axial load bearing ball circuit is not preloaded with maximum axial lash as shown in FIG. 2 or is preloaded without axial lash wherein the balls would contact the opposite sides of both the ball grooves.

Figure 4:
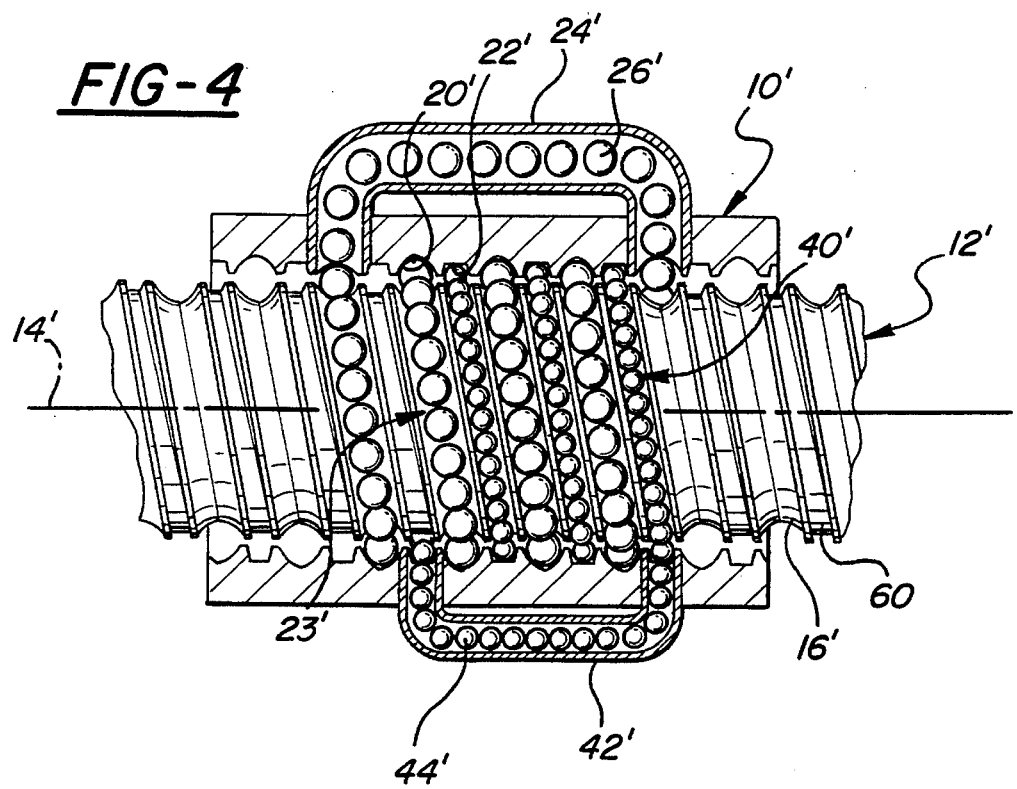
FIG. 4 is a longitudinal sectional view of another embodiment of the ball nut and screw assembly according to the present invention.
Figure 5:
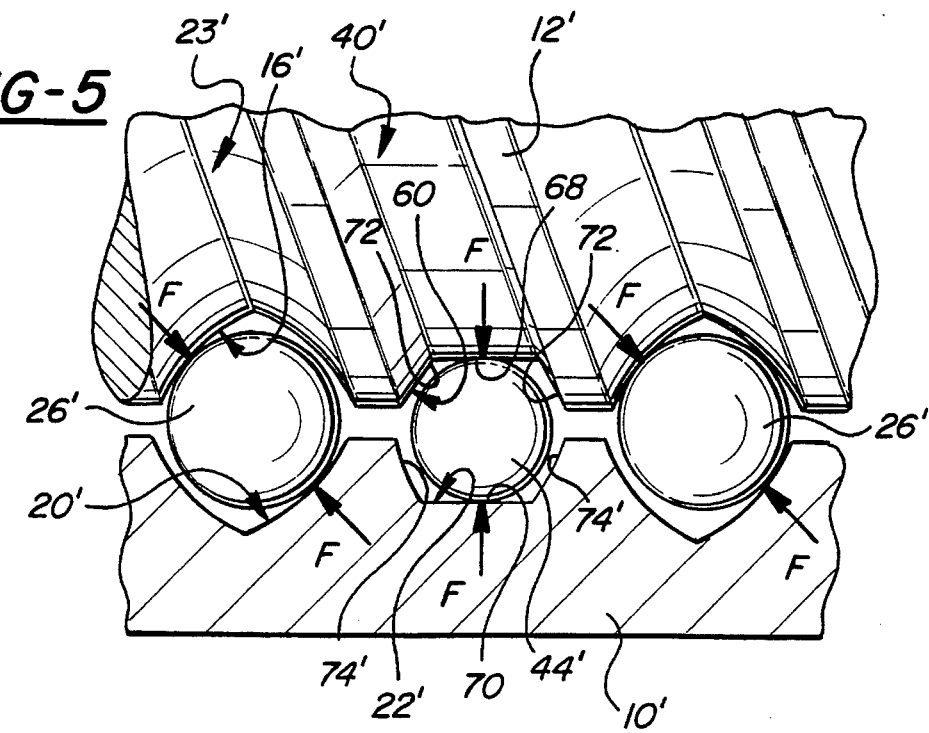
FIG. 5 is an enlarged view of a portion of the radial load bearing helical ball circuit in FIG. 4.

Instead of using the existing helical land on the screw, there may be added a second helical groove to the screw for the radial loads as illustrated in the embodiment in FIGS. 4 and 5. In FIGS. 4 and 5, structure similar to that in FIGS. 1–3 is designated by the same numerals but primed (n') and significantly different structure is designated by new numerals. As illustrated in FIG. 4, the axial load bearing ball circuit comprising the grooves 16' and 20', balls 26' and return tube 24' are like that in the FIG. 1 embodiment. To this structure, there is now added a second lead external helical groove 60 to the screw 12' as well as a second lead internal helical groove 22' in the nut 10'. As such, the screw may be referred to as a double-lead screw and the nut referred to as a double-lead nut that complements this screw. The grooves 60 and 22' parallel the axial load bearing grooves 16' and 20' and co-operatively define a helical radial load bearing raceway 40' for balls 44' like in the FIG. 1 embodiment. The balls 44' are smaller in diameter than the axial load bearing balls 26' and are recirculated by the return tube 42', again like in the FIG. 1 embodiment.

As illustrated in FIG. 5, the respective grooves 60 and 22' are formed at their bottom with a helical land 68 and 70 of constant radius. In the manner of the FIG. 1 embodiment, the height of the raceway 40' and the diameter of the balls 44' are sized in relation to each other so that the balls are slightly preloaded to remain in continuous contact with the helical lands 68 and 70 to accept radial loads as they travel this raceway. In this case, the axial width of the added grooves 60 and 22' is made large enough so that their opposite sides 72 and 74 do not contact the balls 44' within the limits of the maximum lash allowed in the axial load bearing helical ball circuit. That is, the radial load bearing helical ball circuit has significantly more axial lash than the axial load bearing helical ball circuit. Thus, the two helical ball circuits 23' and 40' in the FIG. 4 embodiment are independent of each other and offer the same advantages in that respect as the FIG. 1 embodiment. Furthermore, the relative sizes of the balls and grooves in the two circuits similarly depend on the load capacity requirements and the pitch or lead of the grooves as well as the space available in the nut. As in the first embodiment the spherical balls are selectively fit to be oversized sufficiently to preload the nut and screw in a radial direction.

The invention has been described in an illustrative manner with respect to two embodiments, and it is to be understood that the terminology that has been used is intended to be in the nature of words of description rather than of limitation. Obviously, many modifications and variations of the present invention in light of the above teachings may be made. It is therefore to be understood that within the scope of the appended claims, the invention may be practiced otherwise as specifically shown and described.

What is claimed is:

1. A ball nut and screw assembly comprising a screw, a nut received on said screw, a first recirculating raceway having a helical portion defined between said screw and nut and a plurality of first balls for cooperatively effecting relative translation of said nut and screw on relative rotation thereof wherein essentially all axial loading of said nut and screw is taken through said first balls, said first raceway extending axially helically over a predetermined axial extent of said nut, and a second recirculating raceway having a helical portion defined between said screw and nut and a plurality of second balls for co-operatively establishing a radial lashless condition between said nut and screw and isolating essentially all radial loading of said nut, said second raceway being helically interwoven with said first raceway in said predetermined extent of said nut.

2. A ball nut and screw assembly as set forth in claim 1 wherein said second helical raceway comprises an internal helical groove in said nut and a helical land of constant radius on said screw.

3. A ball nut and screw assembly as set forth in claim 2 wherein said internal helical groove has a curvature with a radius greater than that of said second balls.

4. A ball nut and screw assembly as set forth in claim 1 wherein said second helical raceway comprises an internal helical groove in said nut and an external helical groove on said screw, said grooves having a bottom, of constant radius and substantial width, in continuous contact with said second balls.

5. A ball nut and screw assembly as set forth in claim 1 wherein said first balls and first helical raceway are preloaded without axial lash therebetween.

6. A ball nut and screw assembly as set forth in claim 1 wherein said first balls and first helical raceway have axial lash therebetween.

7. A ball nut and screw assembly as set forth in claim 1 wherein said second helical raceway contacts said second balls at points in a plane perpendicular to a centerline central to said nut and screw.

8. A ball nut and screw assembly as set forth in claim 1 wherein said second balls have a diameter different than that of said first balls.

9. A ball nut and screw assembly as set forth in claim 8 wherein said second balls are of substantially less diameter than said first balls.

10. A ball nut and screw assembly comprising a screw having an external helical groove defining groove portions separated by helical land portions, a nut received on said screw, said nut having an internal helical groove defining groove portions separated by helical land portions and co-operating with said external helical groove to define a first helical raceway between said nut and screw having an axial lead, a train of first balls received in said first helical raceway, said first helical raceway being adapted to contact said first balls only along opposite generally radially extending sides thereof, said first balls being operable in said first helical raceway to effect relative translation of said nut and screw on relative rotation thereof wherein essentially all axial loading of said nut and screw is through said first balls, a radial load bearing raceway configuration on said nut and screw cooperatively defining a second helical raceway between said nut and screw having substantially the same axial lead as said first raceway and which is helically interwoven with said first raceway, a train of second balls received in said second helical raceway and rolling therealong on relative rotation of said nut and screw without transmitting drive therebetween, and said second helical raceway and said second balls being adapted to be in continuous contact in a radial lashless relationship so as to react essentially all radial loading of said nut.

11. A ball nut and screw assembly as set forth in claim 10 wherein said radial load bearing raceway configuration comprises a second raceway internal helical groove portion in said nut formed in said first raceway land portions of said nut and an external helical land portion of constant radius on said screw.

12. A ball nut and screw assembly as set forth in claim 10 wherein said radial load bearing second raceway configuration comprises an internal helical groove portion in said nut and an external helical groove portion on said screw, said second raceway helical groove portion on said screw and nut having a bottom of constant radius in continuous contact with said second balls.

13. A ball nut and screw assembly as set forth in claim 10 wherein said second helical raceway is adapted to continuously contact said second balls at points in a plane perpendicular to a centerline central to said nut and screw.

14. A ball nut and screw assembly as set forth in claim 10 wherein said first balls are preloaded by said first helical raceway without axial lash therebetween.

15. A ball nut and screw assembly as set forth in claim 10 wherein said first balls are not preloaded by said first helical raceway and there is axial lash therebetween.

16. A ball nut and screw assembly as set forth in claim 10 wherein said second balls have a diameter less than that of said first balls.

17. A ball nut and screw assembly as set forth in claim 10 wherein said second balls have a diameter equal to that of said first balls.

18. A ball nut and screw assembly as set forth in claim 10 wherein said second balls have a diameter different than that of said first balls.

19. A ball nut and screw assembly as set forth in claim 11 wherein said second raceway internal helical groove portion on said nut has a curved bottom and said second balls have a radius significantly less than the radius of curvature of said bottom.

20. In a method of fabricating a ball nut and screw actuator assembly with radial load isolating capacity comprised of a ball screw, and a ball nut received on said screw, the assembly having a first helical raceway defined between first raceway land and groove portions on each of said ball screw and ball nut and a plurality of first balls for cooperatively effecting relative translation of said nut and screw on relative rotation thereof wherein essentially all axial loading of said nut and screw is taken through said first balls, and a second helical raceway defined between said ball screw and ball nut and a plurality of second balls for cooperatively establishing a radial lashless condition between said nut and screw and accepting essentially all radial loading of said nut, the step of providing said second helical raceway by one of the steps of:

a) forming said second helical raceway with said first raceway land portions of said screw and with second raceway groove portions provided in said first raceway land portions of the nut; and b) forming said second helical raceway with second raceway groove portions provided in said first raceway land portions of said screw and with second raceway groove portions provided in said first raceway land portions of the nut.

* * * * *